United States Patent [19]

Giese

[11] Patent Number: 4,771,579

[45] Date of Patent: Sep. 20, 1988

[54] ABRASIVE BLAST MEDIA RECOVERY AND CLEANING FOR REUSE

[76] Inventor: James A. Giese, 17108 SE. 261st, Kent, Wash. 98042

[21] Appl. No.: 927,926

[22] Filed: Nov. 6, 1986

[51] Int. Cl.$^4$ .............................................. B24C 9/00
[52] U.S. Cl. ........................................ 51/425; 51/273; 209/240; 209/288
[58] Field of Search ................ 51/273, 319, 320, 424, 51/425; 209/240, 250, 288, 294

[56] References Cited

U.S. PATENT DOCUMENTS

| | | | |
|---|---|---|---|
| 2,455,514 | 12/1948 | Mead | 51/425 X |
| 3,005,547 | 10/1961 | Freeman | 209/32 |
| 3,097,452 | 7/1963 | Freeman | 51/425 X |
| 3,756,406 | 9/1973 | Khan | 209/294 X |
| 4,020,596 | 5/1977 | Bergh | 51/425 |
| 4,140,281 | 2/1979 | Fulghum Jr. et al. | 209/250 X |
| 4,543,029 | 9/1985 | Grun et al. | 209/288 X |

Primary Examiner—Robert P. Olszewski
Attorney, Agent, or Firm—Seed and Berry

[57] ABSTRACT

A process and apparatus are disclosed for recovering and cleaning contaminated particulate abrasives blast media for reuse. A first vacuum system vacuums up spent contaminated blast media from a work site and entrains it in an airstream. The entrained contaminated media is then projected onto a target surface that absorbs momentum of the contaminated media such that media and contaminates at least equal in weight to the media drop out of air suspension while contaminates lighter in weight than the media substantially remain in suspension. The contaminated media that drops out of entrainment falls into a rotating drum having apertured cylindrical wall surfaces that permit blast media to pass therethrough while retaining oversized contaminates. The rotating apertured drum is contained within a housing that is evacuated to substantially remove the lighter weight contaminates from the housing and, hence, from the media. The cleaned media passing through the rotating drum apertured surfaces is collected and returned to the blast cleaning process.

19 Claims, 3 Drawing Sheets

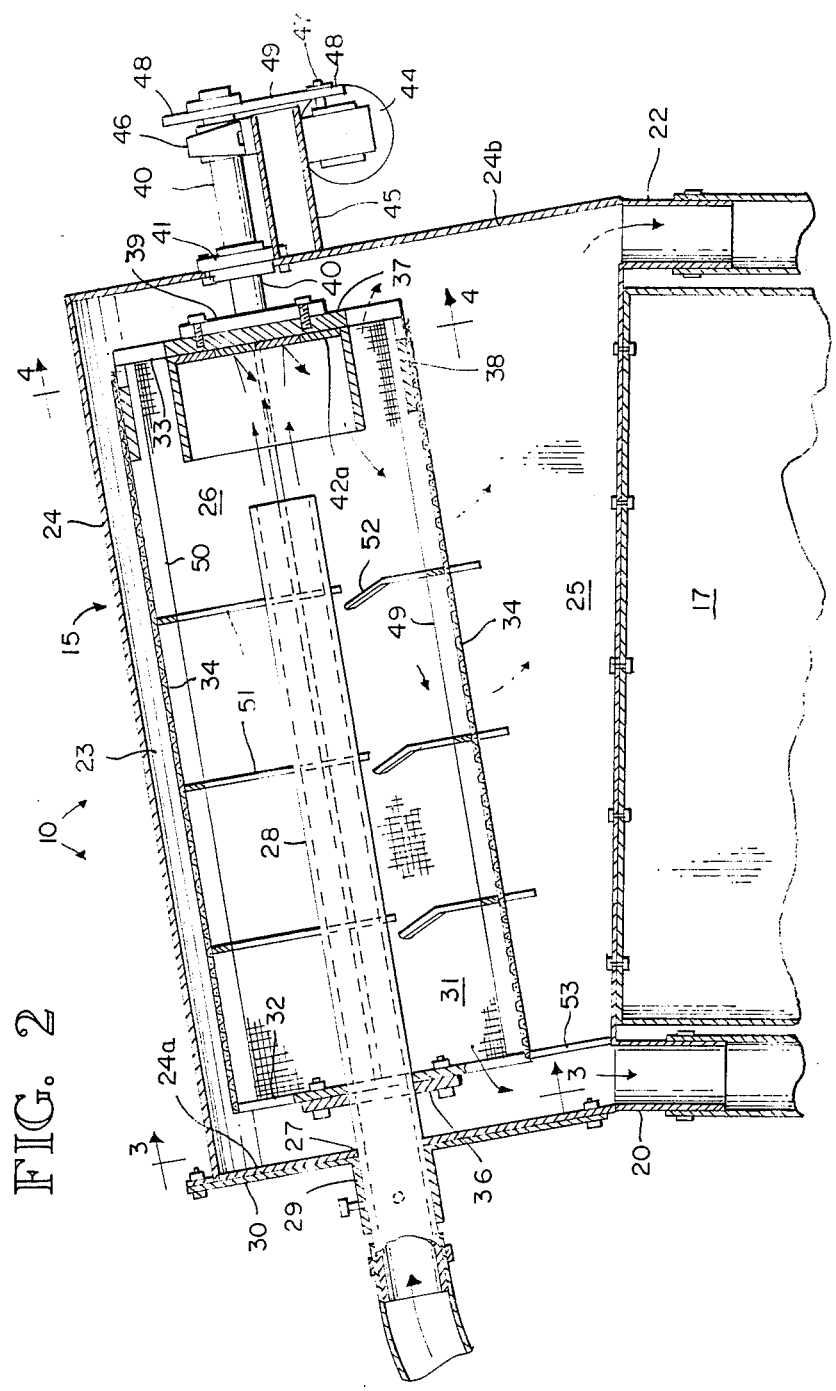

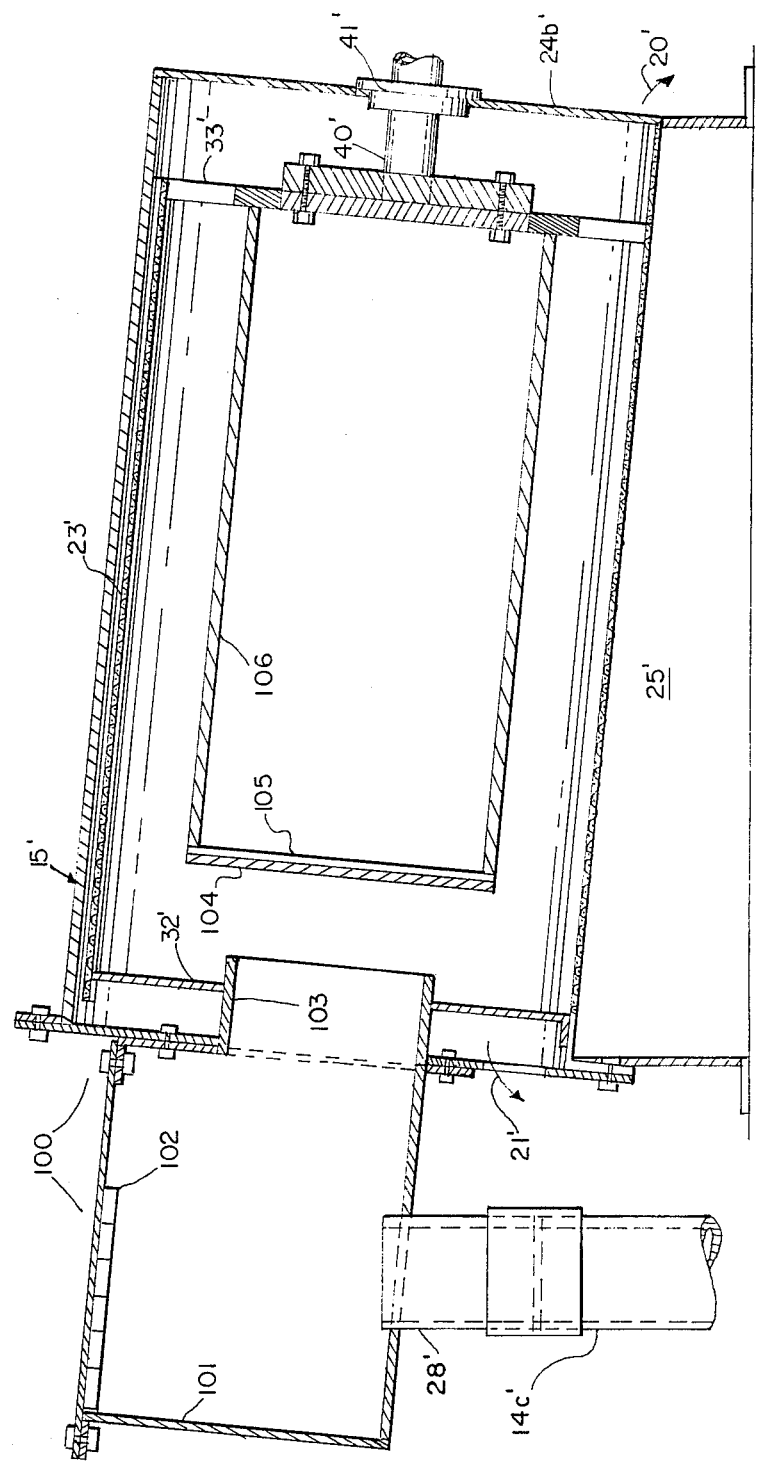

ABRASIVE BLAST MEDIA RECOVERY AND CLEANING FOR REUSE

TECHNICAL FIELD

The invention relates to cleaning an abrasive blast media for reuse. More particularly the invention relates to methods and apparatus for recovering contaminated blast media that has been scattered during use at a work site and cleaning the media for reuse.

BACKGROUND ART

Finishing processes often involve impinging a blast media or an abrasive grit material onto a workpiece to remove dirt, scale, flashing or other such waste. For cleaning small workpieces it is well known in the art to tumble them in a drum within an enclosure which includes a throwing machine for hurling blast materials onto the tumbling pieces. Blast cleaning of larger workpieces or large structures typically involves employing a number of nozzles which direct air entrained abrasive media onto the surface to be cleaned. The workpieces, if manageable, may be moved by conveying means past fixed nozzles. For larger structures, hose-mounted nozzles are moved about as necessary to direct blast media onto the surfaces to be cleaned.

For the smaller workpieces cleaned within an enclosing machine as described above, the blast media, contaminated with removed dirt or waste, falls to the base of the machine from which it is typically augered away to waste or recovery. For the larger cleaning operations, the blast media is likely to be considerably scattered over the work site. The media must be swept up from a relatively large area before conveying it to waste.

When it is desired to recycle a blast media for reuse in a subsequent blast cleaning process, it must be cleaned to remove contaminants and broken media. As shown by Freeman et al. in U.S. Pat. Nos. 3,005,547 and 3,097,452, the recovered media may be subjected to various screening and air separations to remove contaminants. In such cleaning processes, it is conventional to introduce the contaminated material into a rotating drum having apertured cylinder surfaces which allow heavy media of acceptable size to pass through the apertures into a recovery bin. Lightweight contaminating material is blown to waste from the accepted material by causing the material to fall in a thin sheet which is subjected to an air stream. Similar devices that include air separation of lightweight contaminants are described by Freeman in U.S. Pat. No. 3,097,451 and Kriz in U.S. Pat. No. 2,771,189. All these known devices operate on rather finely balanced air separation systems which are difficult to regulate effectively.

In a number of early machines for cleaning grain, lightweight contaminating materials are removed from the grain in a separating drum by sweeping the drum with an air current to carry the fines out, leaving the product grain behind. Robertson in U.S. Pat. No. 1,845,441 includes a separating drum section wherein angular vanes fixed to the interior surfaces of the drum, parallel to the drum axis, lift the grain and tumble it through a counter-current air stream that blows the light material out an elevated end of the drum.

Kahn, in U.S. Pat. No. 3,756,406, describes a pair of rotating concentric coaxial screens, including a first screen which retains straw while passing grain and chaff into an annulus area between the first and second screens. The outer, second screen retains the grain but passes fine dirt. As the grain is conveyed to a discharge end of the apparatus by angled flights mounted on the interior of the larger drum, the grain tumbles and is subjected to a counter-current air stream that blows the dust and chaff out the end of the drum.

The prior patents describe a number of ways of cleaning contaminated material, including apparatus for cleaning contaminated blast media. However, the prior devices all begin with a material that is typically simply dumped into the process or provided by another portion of a manufacturing process. That is, recovery of the media or materials to be cleaned is not an essential part of the recycling process. For example, in the apparatus described by Freeman, noted above, recovery of the blast media is not a problem because the work pieces are relatively small and confined within the apparatus in which the blasting operation is conducted.

As the workpiece to be cleaned become larger and cannot be confined readily, the cleaning operation results in the contaminated blast media being generally scattered about the work site. The beginning point of a recycling operation for those larger cleaning operations is collecting and accumulating the blast media material before cleaning. In most such cases, the collection process requires significant hand labor. These costs, in the past, have simply precluded recycling. Thus, not only has the value of the blast media been lost when it would otherwise be perfectly suitable for cleaning and reuse, but the work site becomes dirty and eventually the materials must be removed to waste anyway. Such waste disposal can today become a problem, particularly where the contaminated blast media after a cleaning operation may include materials regulated as hazardous waste. Disposal cost may be substantial, since contamination with even a small quantity of hazardous waste could require that the entire blast media pile be disposed of as a hazardous waste in a secure waste disposal facility.

DISCLOSURE OF INVENTION

It is an object of the present invention to provide a method and apparatus for cleaning blast media for reuse including recovering scattered, contaminated media from the typical job site, such as a tank fabricating shop.

An apparatus of the invention includes, as a principal component, a vacuum system for entraining spent contaminated blast abrasives media from a work site in a transporting gas. A second principal component of the invention is a separating system for separating acceptable size and weight media from oversize contaminants and lightweight contaminants.

The vacuum system includes a vacuum pump and a suction head that may be moved about the work site as necessary to vacuum up and air-entrain the contaminated spent blast media. The separating systems preferably includes a drum that rotates about its longitudinal axis. The drum is preferably enclosed in a housing and includes a target, interior to the drum, onto which the entrained contaminated blast media is projected. The target absorbs sufficient of the entrainment velocity of the projected media such that substantially all particles that are greater in weight than a minimum acceptable blast media particle fall downward onto separating drum interior surfaces. The lighter weight particles and contaminants remain suspended in air. The separating drum interior surfaces include apertures of sufficient size to permit particles of acceptable blast media to pass therethrough while rejecting oversize contaminates. Preferably, a bin collection system receives the cleaned blast media as it passes through the drum apertures. Also preferably, a fines handling system is provided that removes lightweight particles and contaminants by evacuating the separating drum interior and surrounding area.

A preferred separating drum is provided with a series of interior circumferential ring baffles spaced longitudinally with respect to the drum. Each baffle, comprising an annular ring mounted about the interior surfaces and oriented substantially perpendicularly to the drum axis, is of sufficient height to retard transport of media through the drum such that it has an optimum chance of passing through the apertured surfaces. Each ring baffle may include an opening or cut out section to allow a portion of the retained media to pass therethrough on every revolution, preventing oversize particles from permanently accumulating in the drum. The drum interior surfaces may also be fitted with longitudinal vanes which lift and distribute the media over the circumferential interior of the apertured surface area of the drum.

The target for receiving the entrained blast media is preferably located at an elevated end of the drum. Oversize contaminates discharge from the opposite lower end. Where the media has magnetic properties, the target surface may be constructed of permanent magnets. The magnets accumulate a surface of blast media upon startup, into which subsequent media impacts, thereby reducing wear on the target element caused by the abrasive, impacting media.

In another embodiment of the blast media recovery and cleaning apparatus of the invention, the cleaning or separating portion of the system includes an enclosure supporting a first target onto which the recovered entrained blast media is initially projected. The enclosure includes a conduit through which the media discharges into an aperture rotating drum for separating the contaminates from the media. The drum includes a second target against which any media remaining entrained impinges. The target is preferably a closed end of a cylinder that is concentric with and supported on the separating drum such that the closed end target is positioned adjacent to the conduit through which the media enters the drum.

BRIEF DESCRIPTION OF THE DRAWINGS

FIG. 2 is a sectional elevation view showing the housing and separating drum arrangement of the media cleaning portion of the invention.

FIG. 5 is a sectional view of another embodiment of the separating drum and target arrangement.

BEST MODE FOR CARRYING OUT THE INVENTION

Figure 1:
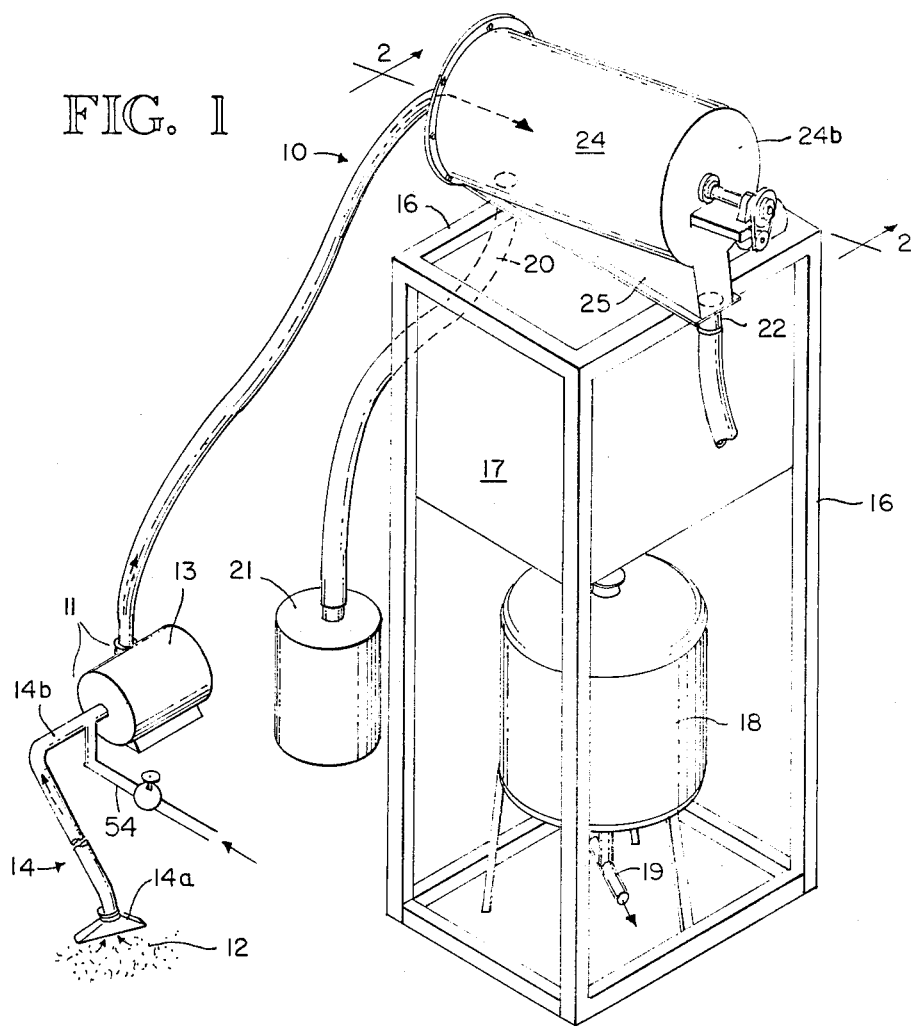
FIG. 1 is an isometric view of the blast recovery system and the blast cleaning system of the invention.

Referring to FIG. 1, the blast media recovery and cleaning apparatus 10 of the invention is shown. A vacuum system 11 is provided for vacuuming up spent contaminated blast media 12 on a work site where workpieces, such as steel tanks (not shown), are cleaned by applying an air entrained abrasive blast media to workpiece surfaces. A vacuum pump 13 provides suction to a suction head system 14 that may be moved about the work site to recover the scattered contaminated blast media 12. The cleaning apparatus 10 further includes a housing 15 that encloses a separating drum for cleaning the blast media of contaminants, as is described in detail below. The cleaning apparatus housing 15 is mounted upon a framework 16 that also supports a hopper 17 for receiving cleaned media. The hopper 17 discharges into a supply pot 18 that feeds, through an air entrainment nozzle 19, a blast cleaning operation (not shown). The housing 15 is provided with a discharge port 20 for discharging oversize contaminants into a waste receiver 21 for disposal. Lightweight fines are discharged from the housing 15 through a conduit 22 which vents to the atmosphere or to a dust collector (not shown), such as a bag house or the like.

The vacuum entrainment system 11 for recovering the contaminated blast media is a key component of the overall invention of recycling the media. In contrast to the prior art, recovery of the blast media material to be cleaned is a necessary initial process step and requires suitable recovery apparatus. The vacuum pump 13 of the invention is preferably a rotary vacuum pump capable of handling extremely abrasive material. Vacuum systems other than rotary vacuum pumps are suitable, depending upon available power and waste-handling resources. For example, steam jet ejectors are particularly suitable for handling abrasive materials.

The suction head system 14 for recovering the spent blast media is most suitably a nozzle 14a fixed to the end of a flexible vacuum hose 14b that can be moved about a job site to recover the media. The arrangement is particularly useful where the workpiece size and location varies from time to time. Where the workpiece is of a predictable size and the work site is fixed, appropriately located permanently mounted suction recovery nozzles may be satisfactory.

The recovery and cleaning apparatus of the invention is useful for handling substantially any blast media where it is economically desirable or environmentally necessary to recover for reuse or disposal a contaminated blast media generated in the cleaning process. Typical blast media are natural sands, carborundums, steel pellets or the like. The invention is generally suitable for recovering substantially any abrasive particulate that is used for cleaning, abrading or otherwise conditioning a surface by means of impinging the abrasive material onto the article to be cleaned. Particularly of interest are abrasives that are ferromagnetic in nature.

In the course of blast cleaning a workpiece, the scattered blast media becomes contaminated with material sought to be abraded, such as flashing material from castings or moldings, dirt, paint, or corrosion scale. Other particulate wastes or sweepings, process dusts and the like also may become mixed with the contaminated media. The media will also be less effective if, over time, broken or abraded blast media material is allowed to build up in the media collected for recycling. Some of the contamination accumulated in the media will include particles, flakes or scales that are larger than the media. Much of the contamination present will be in the form of fine dust or particulates that, in general, are substantially lighter in weight than the blast media particles to be recovered. Thus, an effective cleaning process must remove contaminates that are oversize with respect to media particle size, and undersize contaminates that are lighter in weight than the media that is to be reused.

Referring to FIG. 2, the cleaning portion 10 of the recovery and cleaning apparatus of the invention is shown in section. Contaminated blast media recovered from a work site is cleaned by means of an apertured separating drum 23 mounted interior to the housing 15. The housing 15 supports as well as encloses the separating drum 23 and is preferably constructed to include a cylindrical portion 24 generally concentric about the separating drum 23 and having closed end portions 24a, 24b. The housing 15 also includes, in elevational cross-section, a trapezoidal or wedge-shaped base section 25 designed to elevate the contaminated blast media receiving end section 26 of the separating drum 23 such that recovered media tends to progress downwardly through the separating drum cleaning process aided by gravity. The trapezoidal base section 25 of the housing is narrower in width than the diameter of the separating drum, as shown in FIG. 1. The trapezoidal base section 25 is open where it joins the cylindrical portion 24 of the housing 15 and receives cleaned media as it drops from the separating drum 23 along the longitudinal length of the drum. The bottom portion of the trapezoidal base section 25 is also open and funnels cleaned media into the cleaned media storage bin 17. The base section 25 also functions as a disengagement zone wherein the lightweight fines contaminates separate from the falling curtain of media. The housing 15 generally includes relatively close clearances with respect to the rotating separating drum 23 to avoid fines contaminates collecting in the cleaning apparatus and to allow reasonably sized vacuum equipment.

A housing endwall 24a includes an inlet aperture 27 through which a conduit 28 projects for delivering contaminated blast media into the separating drum 23. The vacuum system 11 for collecting the blast media from the work site is connected by a delivery hose 14c to the conduit 28. The conduit 28 extends along the longitudinal axis of the drum to near an elevated end portion 26 of the separating drum 23. The conduit 28 is preferably a steel pipe or of other such rigid structure and is supported at the housing inlet aperture 27 by means of a supporting sleeve 29 fixed to a base plate 30 that is bolted to the endwall 24a of the housing 15. The conduit 28 is supported by the sleeve 29 such that it provides at least part of the support necessary for supporting the lower section 31 of the rotating separating drum 23.

The separating drum 23 is a cylinder having partially closed end walls 32, 33 and apertured cylindrical surfaces 34. The separating drum is supported at each end for rotation about its longitudinal axis. Preferably, the drum is positioned with the drum end that receives the contaminated blast media higher than the other end such that gravity flow assists the separation process.

Figure 3:
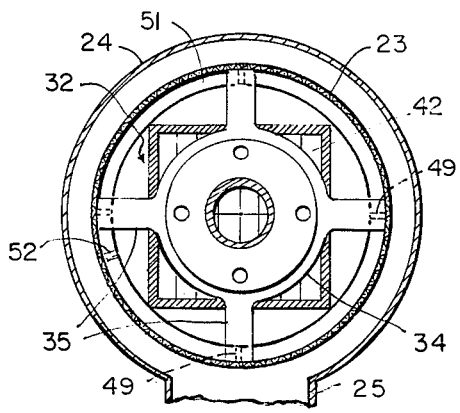
FIG. 3 is a cross-sectional view of the housing and separating drum, along sectional lines 3—3.

The lower end section 31 of the drum is provided with an endwall 32, as shown in FIG. 3, that includes a central portion 34 having projections 35 for fastening the endwall 32 to the separating drum 23 at its periphery. The endwall 32 is largely open at the periphery to accommodate discharge of oversize contaminants and existing air-suspended dust and fines. The central portion 34 of the endwall is fitted with a polyurethane bearing block 36, as shown in FIG. 2, that supports the lower drum end section 31 for rotation on and about the feed conduit 28.

Figure 4:
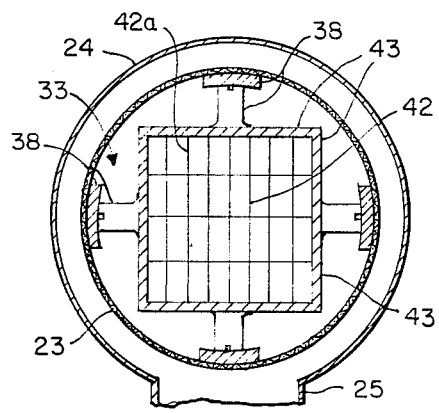
FIG. 4 is a cross-sectional view of the separating drum and housing along sectional lines 4—4, showing the target for receiving the entrained media.

The elevated section 26 of the separating drum is provided with a partially closed endwall 33, shown in FIGS. 2 and 4. The endwall 33 includes a central wall portion 37 and sidewall tabs 38 for adhering to the drum inner circumference. A supporting plate 39 is fastened to the central wall portion 37. The plate 39 supports a shaft 40 in alignment with the longitudinal axis of the drum 23. The shaft 40 supports the elevated end 26 of the drum and transmits rotational energy thereto. The shaft 40 continues in longitudinal axial alignment with the drum through the housing supported on the housing endwall 24b by means of a bearing 41.

The separating drum is rotated about its longitudinal axis through drive shaft 40 by means of a gear motor 44 supported on the housing endwall 24b by means of a bracket 45. The bracket 45 also provides support for a second shaft bearing 46 and aligns the drive shaft 47 of the motor 44 in parallel with the shaft 40. For driving the separating drum 23, sprockets 48 are fitted to the motor shaft 47 and drum drive shaft 40 and connected by means of a drive chain 49.

On the central wall portion 37 of the endwall 33, a target 42 is fixed for receiving the projected contaminated blast media. As best shown in FIG. 4, the target 42 may be rectangular in shape and include a wearing surface 42a against which the entrained recovered contaminated media initially impacts. The target preferably includes sidewalls 43 to confine the impacting media so that it does not directly rebound onto the separating surfaces. Where the media has magnetic properties, the wearing surface 42a is made up of a number of magnetic ceramic tiles adhered to the face of the target 42. The magnets, in combination with the target sidewalls, allow a layer of media to build up on the target face upon startup of the system. Subsequently recovered media impinges upon media already held to the target by magnetic forces rather than on the target face, generally reducing wear on the target wearing surface.

The cylindrical surfaces of the separating drum 23 are apertured to allow passage of clean blast media while rejecting oversize contamination. The surfaces 34 may be screens supported by a skeletal framework or drilled or punched plate. The size and spacing of the apertures is determined by the size and screening characteristics of the blast abrasive material.

The interior of the separating drum 23 is provided with a number of baffles 50 designed to tumble and spread the contaminated media on the apertured surfaces 34. A plurality of ring baffles 51 are mounted on the interior circumference of the separating drum 23 to control the flow of the media through the separating process. These ring baffles 51 are of such a height that the media has sufficient residence time in the drum to pass through the apertures rather than discharge out the lower end 31 of the drum as waste. Each ring baffle 51 includes a cutout or cut and bend portion 52 that permits oversize contaminants to pass through the drum and not permanently be held up behind a ring baffle 51.

In operation, spent contaminated blast media 12 is vacuumed up for cleaning and recycle by a worker moving the vacuum nozzle head 14a about the work site where workpieces have been cleaned by blasting. The vacuum system 11 entrains the media and projects it through the conduit 28 into the rotating, separating drum 23, where it impacts the target 42 at the elevated end of the drum. The target absorbs sufficient momentum from the media and heavy contaminants so that these materials fall and cascade downwards onto the apertured cylinder surfaces 34 of the separating drum. Dust and other lightweight contaminants remain suspended in the entrainment air and are evacuated from the drum internal area through the drum endwall openings and out the housing discharge conduits for disposal.

The media and heavy contaminating material falling onto the drum surfaces begin working down the length of the drum 23. Media of acceptable size eventually discharge through the apertures of the separating drum walls, funneling through the housing base section 25 into the cleaned blast media storage bin 17. As the contaminated blast materials tumble in the separating drum and fall downward into the clean media bin, lightweight fines are removed by entrainment gases sweeping out the housing discharge conduit. Fines removal may be assisted by operation of a vacuum source connected to the discharge conduit 22. Gas velocities are adjusted to remove the lightweight contaminates, but not to have enough energy to prevent acceptable material from falling into the cleaned media bin. The entrained lightweight fines contaminates may be evacuated by means of the same vacuum system used for recovering the media from the work site. Alternatively, a separate evacuating system may be provided, depending upon whether a dust collector is utilized and, if so, its operating requirements.

Oversize contaminates do not fall through the separating drum apertured sidewalls and, thus, traverse the length of the drum. These contaminates are discharged from the lower end section 31 of the drum falling through the adjacent housing discharge port 20 to waste. A baffle 53 is provided to prevent oversize contaminates from falling into the cleaned media storage bin 17.

A recovery and cleaning system 10 of the invention in accord with that shown in the drawings may clean, for example, on the order of 4 tons per hour of a steel abrasive media. Such a system may handle about 12 tons/hr of a sandblast media. A preferred vacuum system utilizes a 750 CFM rotary vacuum pump that develops about 20 inches of Hg vacuum at the suction nozzle 14a. A side connection 54 preferably provides evacuation of the fines from the separating housing 15. A preferred separator drum 23 is on the order of 50" long and 20" in diameter. Such a drum may include a perforated screen surface of 11 gauge wire, providing apertures of ⅛" diameter, on 3/16" centers. The drum is driven by a ½-horsepower gear motor, at about 10 rpm.

Referring to FIG. 5, another embodiment 100 of the target portion of the recovery and cleaning system of the invention is shown. In this embodiment 100, air-entrained, recovered contaminated blast media is transported from a work site through a conduit 14c' into a conduit 28' that projects the media into an enclosure 101 onto a first target 102. The first target 102 is supported on an enclosure wall opposite discharge of the conduit 28'. The enclosure 101 includes a discharge conduit 103 that is in substantial axial alignment with an apertured rotating drum 23' contained in a housing 15'. The apertured drum 23' includes a second target 104 that is fixed onto a closed end 105 of a cylinder 106. The cylinder is concentrically positioned with respect to the separating drum 23' and fixed at its opposite end to an end wall 33' of the separating drum 23'. The separating drum 23' is otherwise similar in function and arrangement to the system shown in FIG. 2 and described above. The rear wall 24b' of the housing and surrounding the separating drum 23' is fitted with the bearing 41' that supports a shaft 40' fixed to the drum 23' for rotating it about its longitudinal axis. The opposite end wall 32' of the drum 23' is apertured to receive the conduit 103 which also supports the drum 23' for rotation about its axis. The enclosure 101 receiving the contaminated blast media and the separating drum 23' that receives the disentrained media for cleaning are oriented at a slope such that gravity assists in the separation of contaminates from the media.

In operation, contaminated blast media is projected onto the first target 102 which absorbs momentum, causing a substantial portion of the media to drop out of air entrainment falling to the bottom of the enclosure. The enclosure 10' is positioned such that the media falls into the separating drum 23'. Any media remaining entrained impacts the second target 105. The process of separating the oversize and the lighter weight fines contaminates that remain entrained in the air flowing through the system proceeds as described above with respect to FIG. 2.

From the foregoing, it will be appreciated that, although embodiments of the invention have been described herein for purposes of illustration, various modifications may be made without deviating from the spirit and scope of the invention. Accordingly, the invention is not limited except as by the appended claims.

I claim:

1. An apparatus for recovering and cleaning contaminated particulate abrasives blast media for reuse, comprising:
   a vacuum system for entraining spent contaminated blast media from a work site in a transporting gas;
   a separating drum having apertured circumferential surfaces, rotatable about its longitudinal axis, said drum including a target interior to the drum for receiving said entrained contaminated media, said target absorbing sufficient entrainment velocity of said media wherein substantially all media particles fall into the separating drum interior onto said circumferential apertured surfaces while lighter weight contaminants remain entrained in said gas, said apertures of sufficient size to permit particles of blast media to pass therethrough but reject oversized contaminates;
   means for removing said gas and entrained lighter weight contaminates from said separating drum interior; and
   a collection system for receiving clean blast media as it passes through said apertured separating drum surfaces.

2. The apparatus of claim 1 wherein said separating drum is enclosed in a housing and a single vacuum means entrains contaminated blast media from the work site into said separating drum and removes lighter weight contaminates said fines from said drum and housing for disposal.

3. The apparatus of claim 2 wherein said vacuum means is a rotary vacuum pump and includes a means for discharging said lighter weight contaminates to a bag house dust collector.

4. The apparatus of claim 1 wherein said separating drum interior surfaces include a plurality of ring baffles spaced axially and longitudinally with respect to the separating drum, each baffle comprising an annular ring fixed to the interior circumferential surfaces and substantially perpendicular to said drum axis, said baffles being of sufficient height to retard transport of blast through the drum and improve distribution of said media over circumferential interior apertured surfaces of the drum such that separation of contaminates from said blast media is enhanced.

5. The apparatus of claim 4 wherein said ring baffles include a cut out section such that a portion of the retained media passes therethrough into a subsequent section of the drum, whereby oversized contaminants do not permanently collect behind said baffles.

6. The apparatus of claim 1 wherein said separating drum is mounted for rotation with its end opposite the contaminated media receiving end lowered to facilitate flow of media through the drum.

7. The apparatus of claim 6 wherein said separating drum lower end discharges blast media contaminants larger than the drum apertures therefrom.

8. The apparatus of claim 6 wherein said separating drum target for receiving entrained contaminants blast media is fixed to an interior end of the rotating drum that is opposite said lower discharge end.

9. The apparatus of claim 6 wherein said separating drum target includes wearing surfaces fixed thereto for absorbing impact of said media.

10. The apparatus of claim 1 wherein said entrained contaminated media is projected onto said target through a conduit which substantially traverses the longitudinal axis of the separating drum and discharges onto said target just sufficiently spaced from said target whereby interference with said discharge is avoided.

11. The apparatus according to claim 1 wherein said means for removing said gas and entrained lighter weight contaminates includes a vacuum.

12. The apparatus according to claim 1 further including:
a housing base section between said separating drum and said collection system through which said blast media falls as it passes from said drum to said collection system, said base section having a more narrow cross-section than a diameter of said drum, said base section being coupled to a vacuum source for removing contaminates lighter in weight than said blast media from said blast media as it falls from said separating drum to said collection system.

13. The apparatus according to claim 1 wherein said means for removing said gas includes a housing and tubing coupling said drum interior to said vacuum system.

14. The apparatus according to claim 13 wherein said drum includes, in an end wall of said drum, openings adjacent to said target, said openings being coupled to said vacuum system to permit gas to be removed from said drum interior.

15. An apparatus for recovering and cleaning heavy and lightweight contaminates from particulate abrasives blast media, having magnetic properties, for reuse, comprising:
a vacuum system for entraining said contaminated blast media having magnetic properties in a transporting gas;
a separating drum having apertured circumferential surfaces, rotatable about its longitudinal axis, said drum including a target interior to said drum for receiving said entrained contaminated blast media, said target having wearing surfaces including magnets fixed to said target wherein said target builds up a layer of said magnetic blast media at start up of said apparatus, upon which subsequently received entrained contaminated blast media impacts, reducing wear on said target wearing surfaces, said target absorbing sufficient entrainment velocity of said media wherein substantially all of said heavy contaminates and said blast media falls into said separating drum interior onto said apertured circumferential surfaces while lighter weight contaminates remain entrained in said gas, said apertures of sufficient size to permit the blast media to pass therethrough but reject contaminates of a size larger than said apertures;
vacuum means for removing said gas and said entrained lighter weight contaminates from said separating drum interior; and
a collection system for receiving contaminate-free blast media as it passes through said apertured separating drum surfaces.

16. An apparatus for recovering and cleaning heavy and lightweight contaminates from particulate abrasives blast media for reuse, comprising:
a first vacuum means entraining in air said contaminates and said media;
a target means for receiving said entrained contaminated media;
a conduit means for directing said entrained contaminated media onto said target such that media and contaminates at least equal in weight to said media drop out of said entraining air while contaminates lighter in weight than said media substantially remain in entrainment;
a rotating drum having apertured cylindrical wall surfaces that permit said media to pass therethrough while retaining contaminates larger than said media, said drum positioned to receive said contaminated media dropping from said target, said drum rotatable about its longitudinal axis and having its longitudinal axis positioned at an angle with respect to the horizontal;
a housing enclosing said target and said rotating drum;
a second vacuum means for removing said air and entrained lighter weight contaminates from said separating drum interior and from said housing and hence, from said media;
a container for receiving said media passing through said apertured separating drum.

17. An apparatus for recovering and cleaning heavy and lightweight contaminates from particular abrasives blast media for reuse, comprising:
a first vacuum means for entraining in air said contaminated media;
a target means for receiving said entrained contaminated media;
a conduit means for directing said entrained contaminated media onto said target such that media and contaminates at least equal in weight to said media drop out of said entraining air while contaminates lighter in weight than said media substantially remain in entrainment;
a rotating drum having apertured cylindrical wall surfaces that permit blast media to pass therethrough while retaining contaminates larger than said blast media, said drum positioned to receive contaminated media dropping from said target means;
said target means including a first target supported in an enclosure adjacent to said rotating drum such that said media and said contaminates dropping out of entrainment upon impacting said first target drop onto said drum aperture surfaces, said enclosure including an exit conduit directing any media and contaminates remaining entrained substantially axially into said separating drum and a second target supported on said separating drum interior, opposite said exit conduit, onto which remaining entrained media and contaminates are directed such that said remaining media and contaminates drop onto said drum apertured surfaces;

a housing enclosing said target rotating drum;

a second vacuum means for evacuating said housing to substantially remove said lighter weight contaminates from said housing and, hence, from said media; and a container for receiving said media passing through said apertured separating drum.

18. An apparatus for recovering and cleaning heavy and lightweight contaminates from particulate abrasives blast media for reuse, comprising:

a vacuum system for entraining contaminated blast media from a work site in a transporting gas;

a separating drum having an apertured circumferential surface, said drum being rotatable about its longitudinal axis and being positioned at an angle with respect to its longitudinal axis while being rotated, said drum including a target interior to said drum for receiving said entrained contaminated media, wherein said entrained contaminated media is directed onto said target causing substantially all media particulates to fall into said separating drum interior onto said apertured circumferential surface while contaminates lighter in weight than said media remain entrained in said gas, said apertures of sufficient size to permit said blast media particulates to pass therethrough but reject contaminates larger than said blast media, said drum interior surface including a plurality of ring baffles spaced axially and longitudinally with respect to said separating drum, each of said baffles comprising an annular ring fixed to said circumferential surface and substantially perpendicular to said drum axis, said baffles being of sufficient height to retard transport of said blast media through said drum and improve distribution of said media over said circumferential surfaces of said drum such that separation of contaminates from said blast media is enhanced; means for removing said gas and entrained lighter weight contaminates from said separating drum interior; and a collection system for receiving clean blast media as it passes through said apertured separating drum surfaces.

19. The apparatus of claim 18 wherein said ring baffles include a cut out section such that a portion of said media passes therethrough into a subsequent section of said drum, to prevent oversized contaminates from permanently collecting behind said baffles.

* * * * *